Feb. 1, 1966  S. W. STEARNS  3,232,712
GAS DETECTOR AND ANALYZER
Filed Aug. 16, 1962  3 Sheets-Sheet 3

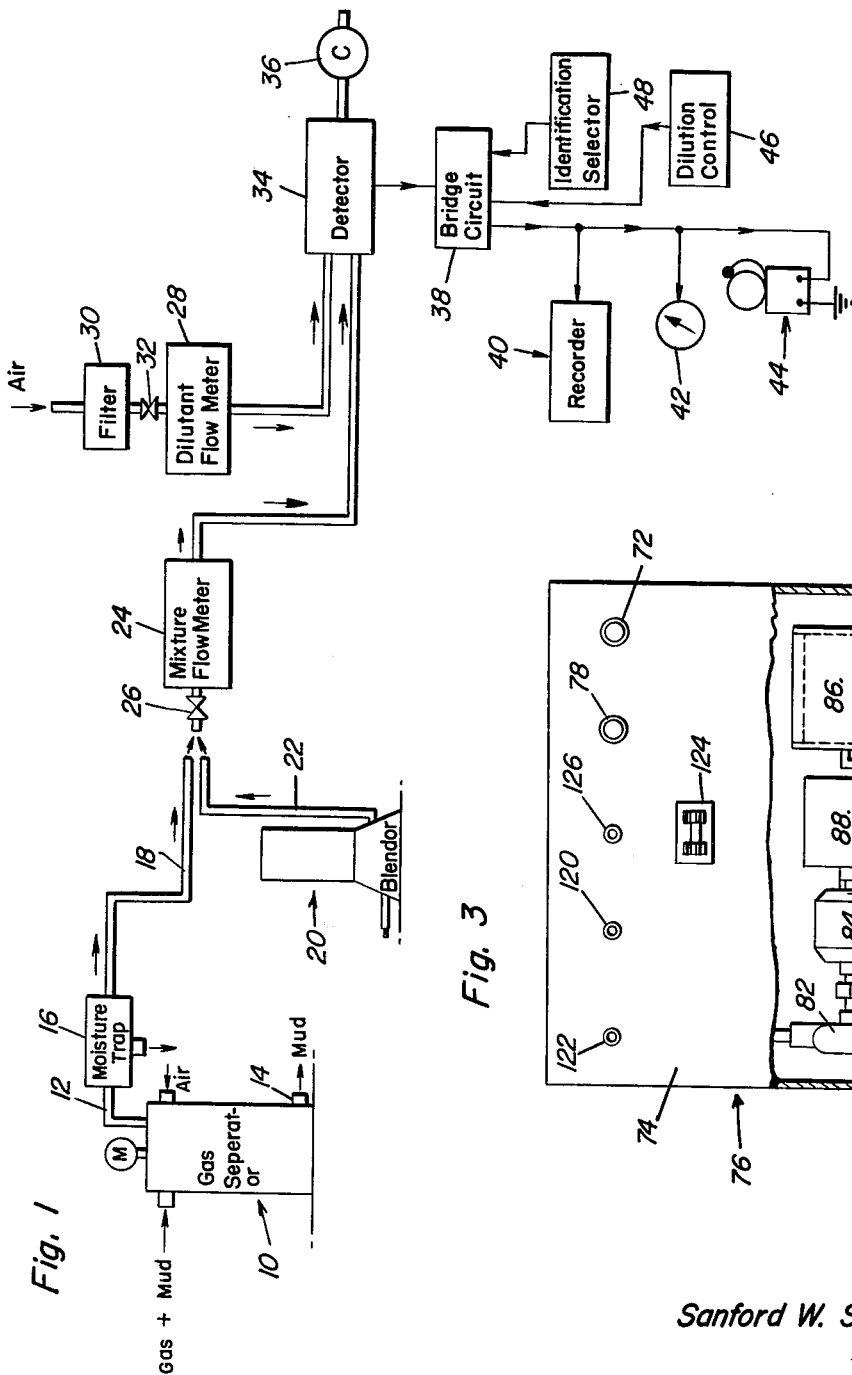

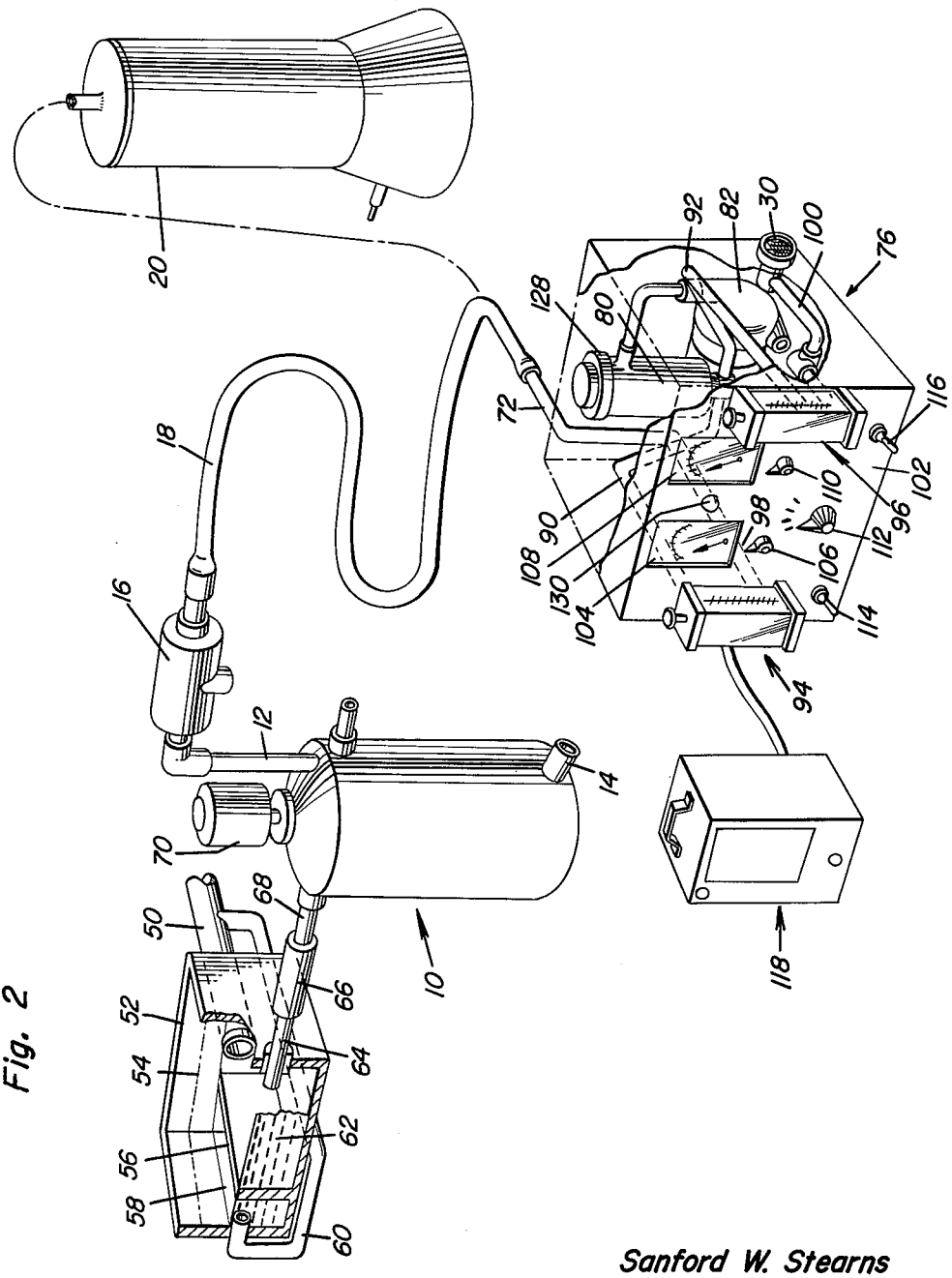

Sanford W. Stearns
INVENTOR.

BY *Clarence A.O'Brien
and Harvey B. Jackson*
Attorneys

United States Patent Office 3,232,712
Patented Feb. 1, 1966

3,232,712
GAS DETECTOR AND ANALYZER
Sanford W. Stearns, Billings, Mont., assignor to Continental Laboratories, Inc., Billings, Mont., a corporation of Montana
Filed Aug. 16, 1962, Ser. No. 217,465
13 Claims. (Cl. 23—255)

This invention relates to a system and apparatus for detecting the presence of a sample gas as well as to identify the gas derived from drilling mud while drilling for oil or gas.

It is therefore a primary object of the present invention, to provide apparatus of a portable and self-powered nature which is particularly useful in connection with the analysis of gas obtained from oil or gas wells during drilling operations. The apparatus is therefore designed to be equally useful for both continuous and batch or intermittent operation.

Another object of the present invention is to provide gas analyzing apparatus employing a novel arrangement of components designed to provide a continuous and useful recording of the presence and amount of gas obtained from a sample as well as to provide facilities for identifying the gas.

A further object of the present invention is to provide a gas analyzer which features an adjustable limit indicating device in connection with a selectively dilutive analysis so as to enable the operator to condition the apparatus for gas identification purposes.

A further object of the present invention is to provide a gas analyzing unit which features an operational malfunctioning alert.

In accordance with the foregoing objects, the system and apparatus of the present invention includes a gas detecting filament mounted within a gas detection chamber through which flow of gas mixture sample and a diluent fluid such as air, in induced. Combustion producing energy in the form of electrical potential producing a flow of current through the gas detecting filament, is applied to the gas detecting filament in order to produce a temperature within the gas detecting chamber necessary to support the reaction or combustion there within in connection with certain types of combustible gas components to be detected. As a result of such combustion, the conductivity of the gas detecting filament is varied so as to provide means for measuring the presence and degree of combustion which would vary with the variation in filament conductivity. In this manner, the relative variations in the combustible component of the gas mixture being sampled, may be recorded so as to provide a quantitative indication of the gas component derived from the drilling mud. The gas detecting filament is therefore connected in one branch of a bridge circuit, the other branch of which contains a compensating filament arranged to balance the gas detecting filament when no combustion occurs within the detection chamber. When combusion does occur therefore, an unbalanced current will flow in the bridge circuit, the value of which will reflect the degree of a combustion. By measuring the unbalanced current flow through a milliammeter and continuously recording the current fluctuations, an analysis of the gas being sampled is obtained. However, an important improvement of the present invention resides in the provision of an alerting device which is rendered operative by closing of a selective alarm switch to indicate the presence of a predetermined ratio of combustible gas or a preselected value of unbalanced current in the bridge circuit, so that the operator may then know that the apparatus is in condition for obtaining an identification of gas component in the gas mixture sample.

Accordingly, a filament voltage selector is provided by means of which the energy supplied to the gas detecting filament may be reduced in steps or by measured amounts until combustion within the gas detecting chamber is no longer sustained as would be indicated by the milliammeter when the bridge circuit is reduced from its unbalanced condition. The filament voltage selector is accordingly calibrated so that the combustible gas component being detected may be classified or identified from the setting of the filament voltage selector as well as from information obtained on the recording of the unbalanced current produced by combustion of the combustible gas component within the detecting chamber. The apparatus also features a malfunction alerting arrangement whereby burn out of the gas detecting filament or excessive voltage surges would protectively by-pass the milliammeter from the bridge circuit as well as to render the alerting signal devices operative. Also, the detecting chamber within which the gas detecting filament is mounted, is controllably supplied with the gas samples and with the diluent fluid by means of adjustable flowmeters. A vacuum pump is also connected to the detection chamber for inducing flow of the gas sample mixture and diluent. The gas sample flowmeter inlet is therefore connectible to either a continuous source of gas mixture obtained for example from a mud and gas separator having a moisture trap operatively connected thereto, or alternatively, the gas sample flowmeter inlet may be connected to blender into which a sample of mud and/or drill cuttings have been placed for the purpose of releasing gas therefrom. The apparatus is therefore operative both in a continuous process or intermittently in connection with a sample batch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a flow diagram of the system of the present invention.

FIGURE 2 is a partial perspective view with parts broken away of the apparatus components of the present invention.

FIGURE 3 is a rear view with parts broken away of the gas detecting and analyzer unit of the present invention.

Figure 4:
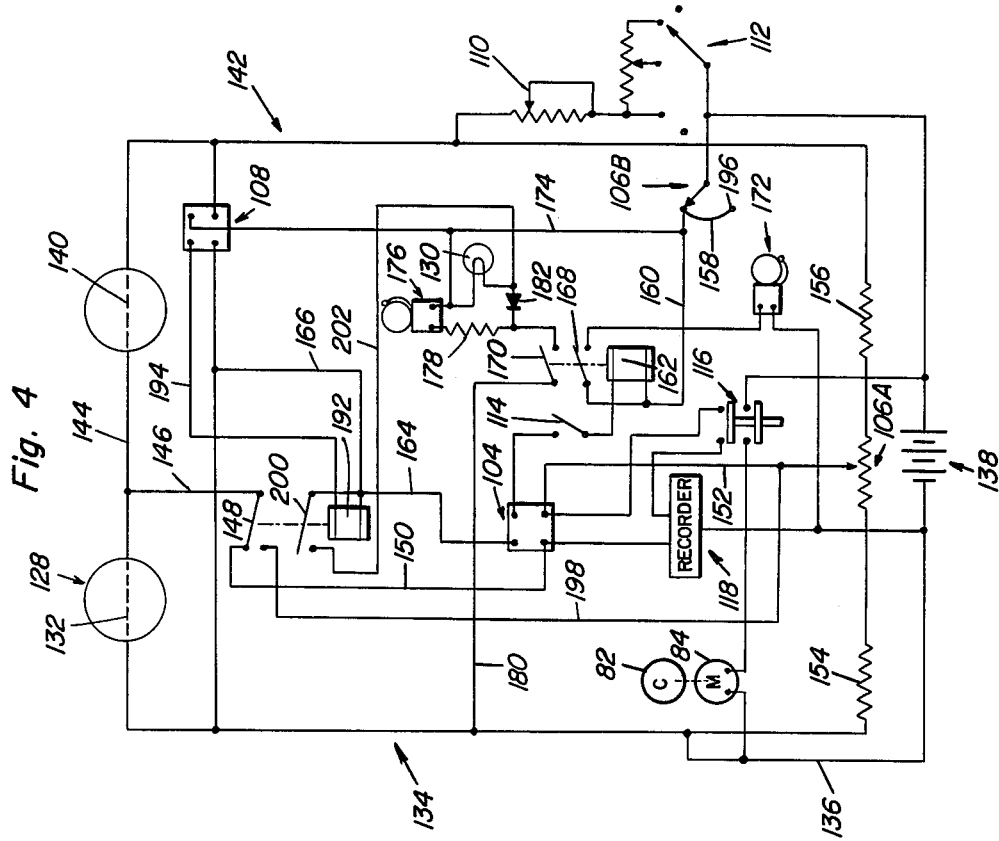
FIGURE 4 is an electrical circuit diagram of the gas detector and analyzer unit.

Referring now to the drawings in detail, it will be observed from FIGURE 1, that operation of the gas detecting and analyzing system may be either continuous or intermittent depending upon the source of sample gas mixture. Accordingly, the sample gas mixture may be derived from mud supplied from a drilling rig to the gas separator 10 which is operative to discharge a mixture of gas and air into the discharge line 12 after separation of the gas from the mud being discharged at the discharge outlet 14. The gas separator 10 may be of any suitable type as for example, the gas separator disclosed in my U.S. Patent No. 3,078,649. The gas-air mixture is then passed a moisture trap 16 by means of which condensate produced by cold air being brought into contact with hot mud, is removed so as to prevent freeze-up. The moisture trap may be of any suitable type such as chemical driers utilizing calcium chloride well known to those skilled in the art. A gas-air mixture, the ratio of which is determined by the gas concentration within the mud derived from the drilling rig, is accordingly supplied by the conduit 18 as the continuous source of sample gas mixture to be recorded. Alternatively, the blender 20 may be filled with a batch of mud which is agitated there within so as to release the gas therefrom. An intermittent source of gas mixture to be sampled, is therefore supplied by the conduit 22.

A regulated flow of sample gas mixture is therefore supplied to the gas mixture flowmeter 24 through the control valve 26 while at the same time, a diluent in the form of air, is supplied to the diluent flowmeter 28 through the filter 30 and the control valve 32. Flow of the gas mixture from the flowmeter 24 and diluent from the flowmeter 28 is induced through a detector chamber 34 by means of a vacuum applied thereto by a vacuum pump 36. In this manner, a selectively controlled dilutive analysis may be made.

The detector chamber device 34 is therefore connected to a bridge circuit 38 through which the presence, the amount and the type of gas component within the sample gas mixture, is detected and recorded. Accordingly, the bridge circuit is operatively connected to a recorder unit 40, a milliammeter 42 and to an alerting signal device 44 for purposes to be hereafter explained. Control over the bridge circuit unit 38 is also exercised by a dilution control 46 so as to render the bridge circuit operative in accordance with the proportion of diluent supplied to the detector chamber 34. The bridge circuit unit 38 is also controlled by means of an identification selector 48 arranged to condition the bridge circuit unit 38 so as to enable classification of the gas component being sampled.

Referring now to FIGURE 2, the apparatus components operatively interrelated as described with respect to FIGURE 1, are shown. In connection with continuous operation of the system of the present invention, it will be observed that drilling mud is supplied by the conduit 50 to a tank 52 having a normal mud level 54. The tank is compartmented by the partition wall 56 so as to provide an overflow compartment 58 to which the by-pass pipe 60 is connected. A controlled flow of mud is therefore drawn from the tank compartment 62 by means of the pipe 64, and coupling hose 66 which connects the outlet pipe 64 to the mud inlet 68 of the gas separator or trap device 10. The gas separator 10 may or may not be powered by the motor device 70 and will be operative to discharge mud from outlet 14 after separation of gas therefrom, the gas mixed with air being discharged into conduit 12 which is connected to the moisture trap 16. A flexible hose 18 is therefore provided for supplying the gas mixture sample to a gas inlet connection 72 which is disposed in the back wall 74 of a gas detector and analyzer unit generally referred to by reference numeral 76 as more clearly seen in FIGURE 3. The back wall 74 of the unit 76 is also provided with an exhaust outlet 78 through which waste gas is discharged from a detector chamber 80 mounted within the unit 76 as more clearly seen in FIGURE 2. Also mounted within the unit 76 and connected to the gas detector chamber 80, is a vacuum pump 82 to which the waste gas outlet 78 is connected and by means of which flow is induced through the detector chamber. A motor 84 is therefore drivingly connected to the pump 82 within the unit 76 which also mounts there within, an oil reservoir 86 from which lubricating oil is withdrawn by a self-lubricating device 88 arranged to lubricate and clean the pump 82. The detector chamber 80 is therefore connected to outlet conduits 90 and 92 from gas flowmeter 94 and diluent flowmeter 96 respectively. Inlet conduits 98 and 100 are therefore respectively connected to the flowmeters 94 and 96 for respectively supplying the gas mixture sample and filtered diluent air. The inlet conduit 100 to the diluent air flowmeter 96, is therefore connected to an air filter 30.

Mounted in exposed relation on the front face 102 of the gas detector and analyzer unit 76, is a milliammeter device 104 having associated therewith, a zeroing potentiometer and limit selector control assembly 106 for purposes to be hereafter explained. Also mounted on the front face 102 of the unit 76, is a voltmeter 108 having associated therewith, a dilution voltage potentiometer 110. Mounted below the control assemblies 106 and 110, between the flowmeters, is a detecting filament voltage selector 112 by means of which gas identification is obtained. Mounted below the flowmeters on opposite sides of the front face 102, are the alarm switch 114 and the pump and recorder control switch 116. A recorder unit 118 is therefore provided and electrically connected to the unit 76 through a recorder plug-in terminal 120 on the back face panel 74 of the unit as shown in FIGURE 3. The back face panel is also provided with a battery plug-in device 122 to which a 12-volt D.C. battery may be connected. Also provided on the back face, is a circuit protecting fuse device 124. Finally, a plug-in device 126 is provided for an external single alerting device of any suitable type. The detecting filament is mounted within the detecting chamber 80 by means of the filament base 128 for easy removal and replacement. Also, a pilot lamp 130 is mounted between the milliammeter 104 and voltmeter 108 on the front face 102 of the unit 76 for the purpose of indicating malfunction of the unit or as one of the selectively set alerting signals to be hereafter described.

Referring now to FIGURE 4 in particular, it will be observed that the gas detecting filament 132 is connected within one parallel branch 134 of a bridge circuit by means of the conductor 136 interconnecting one terminal of the detecting filament 132 to the negative terminal of the battery 138. The positive terminal of the battery 138 is connected by means of the filament voltage selector switch 112 and the potentiometer 110 to one terminal of a compensating filament 140 within the other parallel branch 142 of the bridge circuit. Conductor 144 interconnecting the filaments 132 and 140, is connected to the unbalance current carrying conductor 146 of the bridge circuit. The conductor 146 is therefore connected by means of the relay switch 148 and conductor 150 to one terminal of the milliammeter 104, the other operative terminal of which is connected by the conductor 152 to a zero setting potentiometer 106a by means of which the bridge circuit is adjusted to a balanced condition. The potentiometer 106A is therefore connected to the opposite terminals of the battery 138 by means of the resistors 154 and 156. It will be observed however, that the voltmeter potentiometer 110 and the filament voltage selecting switch 112 are connected in series with the battery 138 so as to be capable of reducing the voltage or potential applied across the filaments 132 and 140. Inasmuch as the voltage applied across the filaments is proportional to the energy supplied to the filaments, by varying the resistance value of the potentiometer 110 and switch device 112, the amount of heat generated by the filament 132 may be controlled so as to control the reaction or combustion occurring within the detection chamber 80 within which the filament 132 is mounted. However, in the absence of any combustible gas within the detection chamber, a balanced condition of the bridge circuit would produce no current through the line 146, switch 148, line 150, ammeter 104 and line 152 to the potentiometer 106a indicating the absence of any combustible gas component in the mixture being sampled. In the presence of a combustible component in the gas being sampled however, unbalanced current would be indicated on the ammeter 104 as well as being recorded on the recorder 118 connected in parallel therewith through the switch device 116 when closed. Accordingly, a recording of the presence of combustible gas and the amount thereof as reflected by the value of the unbalanced current in the bridge circuit, will be recorded on the recorder 118 when the switch 116 is closed so as to not only render the recorder 118 operative but to also energize the motor 84 for operating the pump 82 in order to induce flow of the gas mixture being sampled. Also, the ammeter 104 and voltmeter 108, have associated therewith contact relays operative to open the ammeter and voltmeter circuits respectively in response to excessive current or voltage in order to protect the delicate parts thereof. The ammeter 104 will therefore ordinarily be operative to indicate the unbalanced current representing the amount of combustible gas component within the mixture being sampled while the voltmeter 108 will ordinarily indicate the amount of energy being supplied to the gas detecting filament necessary to sustain continuous combustion within the detecting chamber.

The switch section 106b mounted on the switch control assembly 106 associated with the ammeter 104, constitutes a selective indicating limit control which is connected to the positive terminal of the battery 138 and through a selected amount of resistance 158 will supply energizing current through the conductor 160 to the relay 162. The energizing circuit for the relay 162 is however operatively conditioned by the closing of the alarm switch 114 by means of which the relay is connected to one terminal of the milliammeter 104, the other terminal of which is connected by the conductors 164, 166 and 136 to the negative terminal of the battery 138. Accordingly, upon closing of the alarm switch 114, and the establishment of a predetermined unbalanced current through the ammeter 104, preselected by the setting of the limit selector 106b, the relay 162 will be energized so as to close the alerting signal relay switches 168 and 170. Upon closing of the relay switch 168, an external signalling device 172 will be energized since one terminal thereof is connected to the relay switch 168 while the other terminal is connected to the negative terminal of the battery 138. Simultaneously therewith, a circuit is completed through the conductor 174, the internal signalling device 176, the resistor 178, the closed switch 170 and conductor 180. Both the internal and external signalling devices 172 and 176 are thereby simultaneously energized so as to sound an audible alarm. Also, a parallel circuit would be established through the conductor 174, the pilot lamp 130 and the diode 182 so as to illuminate the pilot lamp 130. Upon receipt of these alerting signals, the operator may then condition the circuit for gas identification purposes.

It will be appreciated, that the alarm circuits established upon closing of the alarm switch 114 will provide the alerting signals in connection with the predetermined degree of combustion corresponding to a predetermined ratio of combustible gas to air. Selective control of the adjusting valve of the flow meters 94 and 96 may however provide a variation in the mixture ratio range with respect to which the setting of the voltmeter potentiometer 110 is adjusted so as to obtain accurate voltage readings on the scale of the voltmeter 108. The filament voltage selector 112 on the other hand, is provided for the purpose of adding additional resistance in series with the battery 138 so as to further reduce the voltage applied to the filaments in order to reduce combustion producing energy. The settings of the filament voltage selecting device 112 is therefore calibrated in connection with the different types of combustible gases to be encountered or detected. Accordingly, after receipt of the alerting signal, the switch device 112 will be moved to a setting so as to reduced the unbalanced current in the bridge circuit as will be reflected on the ammeter 104 and the recorder 118. The resulting reduction in the voltage applied to the filament as indicated on the voltmeter 108 as well as the amount of current unbalance in the bridge circuit, may be utilized to identify the combustible gas component being detected.

Figure 5:
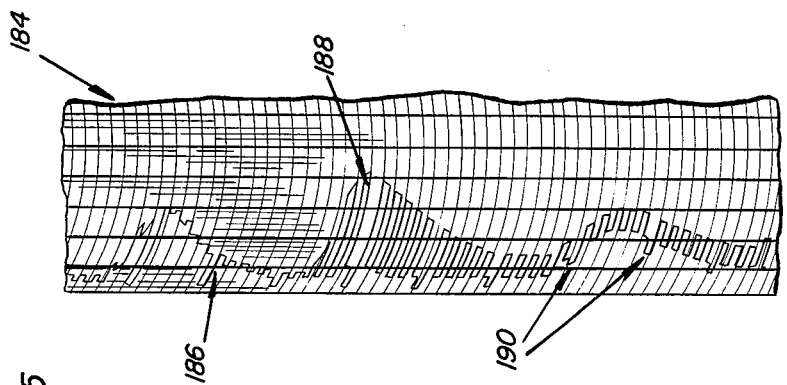
FIGURE 5 is a sample portion of a recorded analysis obtained from the recorder unit of the present invention.

Referring therefore to FIGURE 5 in particular, it will be observed that the sample recording 184 shows three different recording characteristics obtained in connection with the three different operative settings of the filament voltage selecting device 112 as shown in FIGURE 4. In one setting of the filament voltage selector 112, reduction in the bridge circuit current as indicated at the portion 186 of the graph is indicative of the presence of butane or propane as the combustible gas component. In another setting of the filament voltage selector 112, reduction in the bridge circuit current indicates the presence of methane and ethane as indicated on the portion 188 of the graph in FIGURE 5. Hydrogen gas on the other hand is indicated by the portions 190 on the graph.

Another useful feature of the unit 76, involves the malfunction sensing facilities hereinbefore mentioned. It will therefore be observed from the circuit of FIGURE 4, that when an excessive voltage is applied to the filaments because of burn out of the detecting filament 132 for example, an energizing current would be established in the relay circuit for the relay 192 connected to the voltmeter 108 by the conductor 194. Thus, when the limit selector 106b is set at its high resistance terminal 196, an excessive voltage surge would produce an energizing current through the relay 192 so as to actuate the by-pass relay switch 148 establishing a shunt connection by the conductor 198 across the ammeter 104 as a protective measure. Also, energization of the relay 192 in response to excessive voltage, will close the alerting relay switch 200 so as to establish a circuit through the conductor 202 and the internal signal device 176 and pilot lamp 130 in parallel therewith providing the operator with a malfunction indicating alarm. This will occur without closing of the alarm switch 114 and with the limit indicating selector 106 moved to the terminal 196 when the operator desires to test the operating condition of the gas detector unit 76.

From the foregoing description, the operation and utility of the system and apparatus of the present invention will be apparent. It will therefore be appreciated, that the apparatus of the present invention is capable of being utilized intermittently or continuously in connection with the sampling of mud during drilling operations so as to detect the presence of gas as well as to provide an indication of the type of gas present. The system is also completely operative from a 12-volt D.C. source and involves a plurality of circuit systems for gas identification purposes. The apparatus also features a calibrated dilutive analysis rendering it useful in connection with a wide range of gas to air ratios. Also, the dual purpose alerting system described for both indicating malfunction and providing an indication that the device is conditioned for gas identification purposes, significantly simplifies the circuitry, the weight, size and expense of the apparatus components.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gas detecting and analyzing system comprising, gas sampling means receiving a gaseous specimen, selectively controlled dilution means for supplying diluting fluid, detecting chamber means operatively connected to said sampling means and said dilution means for confining a detectable reaction therein, reaction producing means operatively mounted within said chamber means, reaction indicating means operatively connected to said reaction producing means to detect the presence and degree of said detectable reaction within said chamber means, limit indicating means rendered operative by the reaction indicating means in response to a preselected degree of reaction within said chamber means for producing a first alerting signal, and malfunction sensing means operatively connected to said limit indicating means and the reaction producing means for disabling said reaction indicating means and producing a second alerting signal in response to malfunction of the reaction producing means.

2. The combination of claim 1, wherein said reaction producing means comprises a current carrying detecting filament, and potential applying means connected to said detecting filament.

3. The combination of claim 2, wherein said reaction indicating means comprises, a bridge circuit operatively connecting said potential applying means to said detecting filament and having a compensating filament connected in one branch for balancing current flow through said detecting filament in another branch, and unbalance current measuring means connected between said branches of the bridge circuit to indicate the presence and degree of reaction as reflected by the affect thereof on the conductivity of said detecting filament.

4. The combination of claim 3, wherein said limit indicating means comprises, relay means energized by unbalanced current, in said bridge circuit, limit selector means operatively connecting the potential applying means to said relay means for preselecting the level of unbalanced current operative to energize the relay means, and alarm means operatively connected to said relay means for producing said first alerting signal in response to energization thereof.

5. The combination of claim 4, wherein said malfunction sensing means comprises, voltage responsive means operatively connected across said filaments, by-pass control means responsive to energization of said voltage responsive means by an excessive voltage drop across said filaments for disabling said reaction indicating means and means operative simultaneously with the by-pass control means for rendering said limit indicating means operative to produce the second alerting signal.

6. The combination of claim 5, wherein said alarm means comprises, an internal signal device and a pilot lamp connected to the relay means and the voltage responsive means for producing said second alerting signal and an external signal device connected to said relay means and rendered operative simultaneously with said internal signal device to produce said first alerting signal.

7. A gas detecting and analysis system comprising, gas collecting means, selectively controlled sample dilution means, detecting chamber means operatively connected to said sample collecting means and sample dilution means for supporting a detectable reaction therein, reaction producing means operatively mounted within said chamber means, current indicating means operatively connected to said reaction producing means and rendered operative to indicate the presence and degree of a reaction within said chamber means, limit indicating means operatively connected to the reaction producing means and responsive to a preselected degree of reaction within said chamber means for producing a first alerting signal, energy level indicating means connected to said reaction producing means for measuring the voltage drop across the reaction producing means, voltage responsive means operatively connected to said energy level indicating means for energization in response to an excessive voltage drop, by-pass control means operatively connected to said voltage responsive means for disabling said current indicating means in response to a defect in said reaction producing means and means responsive to energization of the voltage responsive means to render said limit indicating means operative to produce a second alerting signal.

8. The combination of claim 7, wherein said limit indicating means comprises, selectively conditioned relay means energized by a preselected value of reaction indicating current passing through said current indicating means, limit selector means operatively connected to said selectively conditioned relay means for preselecting said value of reaction indicating current or render the defect sensing means effective, and alarm means operatively connected to said selectively conditioned relay means for producing said first alerting signal in response to energization of the relay means.

9. The combination of claim 8, wherein said alarm means comprises, an internal signal device and a pilot lamp connected to the relay means and the voltage responsive means for producing said second alerting signal and an external signal device connected to relay means for producing said first alerting signal.

10. The combination of claim 1, wherein said gas sampling means comprises, a continuously operative mud and gas separator, moisture removal means operatively connected to said separator, a sample gas flowmeter operatively connecting the moisture removal means to the detection chamber means and pump means operatively connected to the detection chamber means for inducing flow of said gas sample therethrough at a constant rate of flow.

11. A gas detecting and analyzing device for continuously or intermittently recording the presence and type of gas supplied thereto, comprising, combustion chamber means, combustion detecting mean connected to the chamber means, selectively controlled gas diluting means operatively connected to the combustion chamber means, limit signalling means connected to the combustion detecting means for indicating combustion of a predetermined ratio of combustible gas and combustion supporting diluent supplied by the gas diluting means to the combustion chamber means, combustion energy supply means operatively connected to the combustion detecting means for sustaining continuous combustion of a mixture of the combustible gas and the diluent supplied to the combustion chamber means, energy level measuring means operatively connected to the combustion energy supply means for measuring energy supplied to said detecting means, and defect sensing means connecting said energy level means to the limit signalling means for producing an alerting signal in response to supply of excessive energy to the detecting means.

12. A gas analyzing system comprising sampling chamber means supplied with a sample specimen, selectively controlled dilution means connected to said sampling chamber means for diluting said sampled specimen, a conductive filament mounted in said sampling chamber means for igniting said diluted specimen, a source of potential, a bridge circuit having a pair of interconnected branches, said filament being connected in one of the branches, current measuring means connected between said branches for indicating flow of unbalanced current resulting from changes in the conductivity of said filament, selective control means connecting said source of potential to the bridge circuit for varying the electrical energy supplied to the filament, voltage measuring means connected to the bridge circuit for indicating the level of energy supplied to the filament, limit relay means connected to the current measuring means, limit selector means connecting the source of potential to the limit relay means for energization thereof in response to a preselected unbalanced current, alarm means rendered operative in response to energization of said limit relay means, voltage responsive means connected to said voltage measuring means and the limit selector means for by-passing the current measuring means when the energy level on the filament is excessive and defect signalling means rendered operative simultaneously with said by-pass of the current measuring means for rendering the alarm means operative without energization of the limit relay means.

13. In a gas detecting system having a bridge circuit, a detecting filament in one branch of the bridge circuit, a source of voltage connected to the bridge circuit, an ammeter for measuring unbalance current in the bridge circuit and a voltmeter for measuring the volt drop across the detecting filament, the improvement comprising, current sensing relay means connected to the ammeter, limit selecting means connecting said source of voltage to the current sensing relay means for energization thereof in response to a preselected level of unbalance current, voltage sensing relay means connected to the voltmeter, means connecting the voltage sensing means to the limit selecting means for energization in response to an excessive voltage drop across the detecting filament, by-pass switch means responsive to energization of said voltage sensing relay means for shunting said ammeter, and alarm means operatively connected to both of said relay means for producing one alerting signal in response to energization of the current sensing relay means and a different alerting signal in response to energization of the voltage sensing relay means.

References Cited by the Examiner
UNITED STATES PATENTS

| | | |
|---|---|---|
| 2,349,250 | 5/1944 | Doan. |
| 2,441,677 | 5/1948 | Stallsmith _____ 23—255E X |
| 2,618,150 | 11/1952 | Willenborg _____ 23—255E X |
| 2,904,406 | 9/1959 | Moore _____ 23—254E X |
| 2,955,922 | 10/1960 | Christy. |

MORRIS O. WOLK, *Primary Examiner.*

DELBERT E. GANTZ, *Examiner.*